Figure 1:
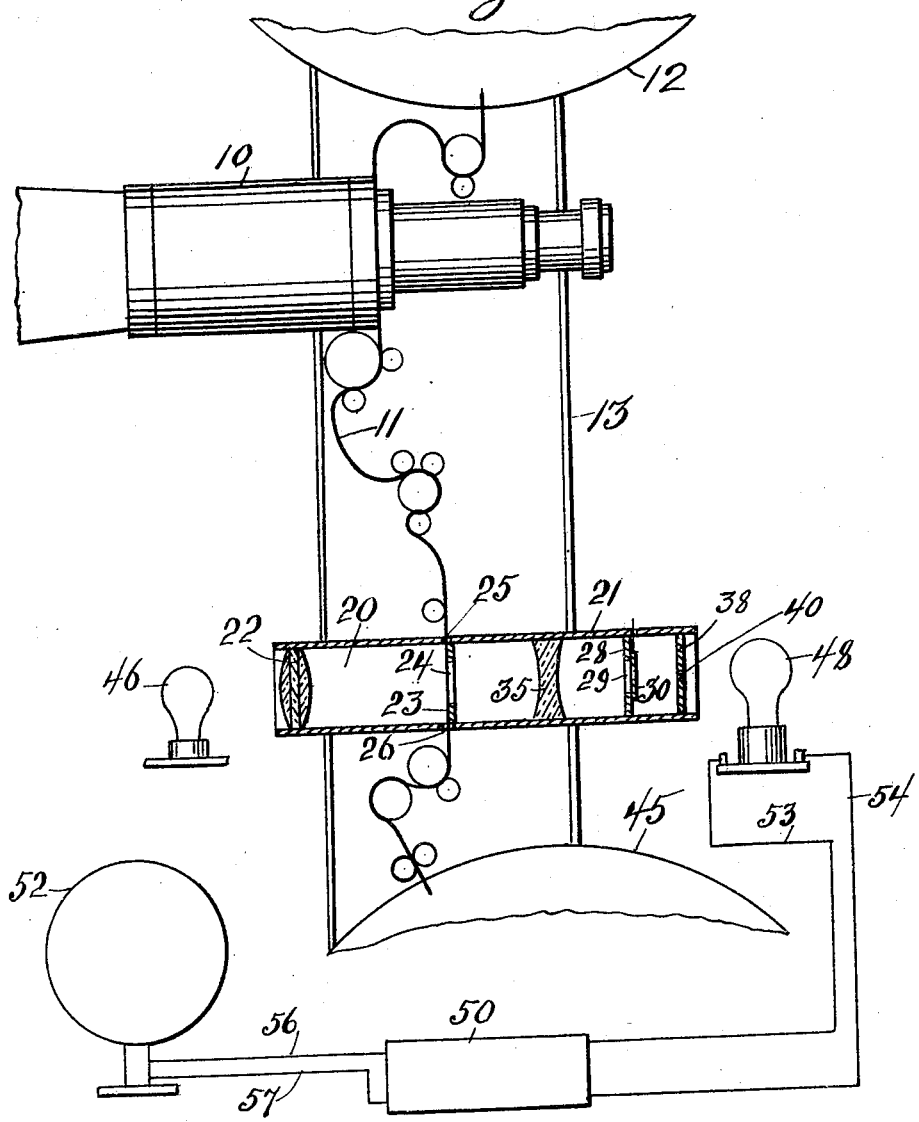

Aug. 16, 1932.  L. A. WILSON ET AL  1,871,643
APPARATUS FOR SOUND REPRODUCTION WITH ARTICULATE MOTION PICTURE FILMS
Filed Nov. 28, 1930

INVENTORS
Lyman A. Wilson
AND
Joseph Johnson
By A. A de Bomeville
ATTORNEY

Patented Aug. 16, 1932

1,871,643

UNITED STATES PATENT OFFICE

LYMAN A. WILSON AND JOSEPH JOHNSON, OF NEW YORK, N. Y.

APPARATUS FOR SOUND REPRODUCTION WITH ARTICULATE MOTION PICTURE FILMS

Application filed November 28, 1930. Serial No. 498,661.

This invention relates to improvements in apparatus for sound reproduction with articulate motion picture films. The object of the invention is the elimination of extraneous noises and faults resulting from foreign matter, such as dirt, fuzz, film emulsion and the like on the film guide plate, thereby partly obscuring the slit in said plate, through which the light passes, to excite the light sensitive element. The second object of the invention comprises apparatus to project the light sound record of a film, having either a constant width of varying density, or of constant density with varying width, to excite a light sensitive element and the apparatus therefor.

The third object of the invention relates to apparatus for projecting the light sound record of a picture film, which is either smaller or larger than the standard film, whereby beams of light corresponding to those from a standard size film, impinge on the light sensitive element. The fourth object of the invention is the production of a lens system by means of which, sound markings of various proportions and sizes may be used to function with a light sensitive element. The fifth object of the invention is the production of a light chamber, which functions with a motion picture machine and other appurtenances, whereby the picture projected by the motion picture machine is synchronized with the sound produced by a loud speaker, irrespective of the size and style of the sound record of the film of the motion picture machine. The sixth object of the invention is the production of a light chamber which functions with a motion picture projecting machine, adapted for amateur use and with which the usual small 16 millimeter film having a light sound record is used, and with which sound is produced as with a film having a light sound record of standard size.

The organization of the invention includes a light chamber provided with an articulate film guide plate, having a large aperture instead of the usual microscopic slit. A diaphragm plate with an opening and an adjustable or iris shutter is spaced from said film guide plate. An end plate having the standard microscopic slit is spaced from the diaphragm plate. In front of and spaced from the film guide plate is positioned a condenser lens with a source of light. Between the film guide plate and the diaphragm plate is located a converging or diverging lens as required, and adjacent to the diaphragm plate is located an end plate having a microscopic slit. A light sensitive element is located adjacent to said end plate.

Figure 2:
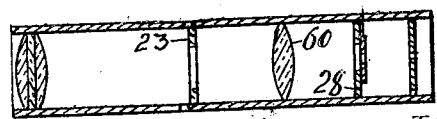

In the accompanying drawing Fig. 1 represents a diagrammatic view of a motion picture projecting apparatus, with the light chamber and appurtenances of the invention, to project pictures in synchronism with sound produced from a light sound record and Fig. 2 shows a fragmentary portion of Fig. 1 with a slight modification. Referring to Fig. 1 a fragmentary portion of a motion picture projecting machine is indicated at 10. The upper magazine for the picture film 11 is indicated at 12. The said film has photographed thereon, a light sound record in synchronized position with its regular pictures. The said film 11 enters the film chamber 13 in the usual way and passes through the motion picture projector by means of the usual sprocket chain wheels and guide rollers as indicated. The light chamber, which is the specific novelty of this invention is indicated in its entirety by the numeral 20. The said light chamber 20, comprises the shell 21, which intersects the film chamber 13. The shell 21, in this instance is tubular in cross section, and at one end thereof is positioned the condenser lens 22. The articulate film guide plate 23, having the large aperture 24 is secured in the light chamber 20. The said aperture is proportioned to allow a beam of light to pass through a number of markings of the light sound record on the film 11, but not through the regular pictures of the said film. Openings 25 and 26 are formed in the shell 21, for the passage of the film 11. The said openings are positioned to guide the film 11, through the light chamber 20, adjacent to the film guide plate 23. A diaphragm plate 28, having the opening 29, with the adjustable or iris shutter 30, is positioned in the shell 21. A diverging lens 35, is positioned in the shell 21, between the film guide plate 23 and the diaphragm plate 28. An end plate 38, having the usual microscopic slit 40, is secured at one end of the shell 21. The film chamber 13, extends to the take up magazine 45 for the film 11. The film 11 after passing through the light chamber 20, is wound up in the take up magazine 45, in the usual way. An electric light 46, is positioned in front of the lens 22 and a photo electric cell 48, is positioned opposite the slit 40, of the end plate 38. An amplifier is indicated at 50 and a loud speaker is shown at 52. Wires 53 and 54 connect the photo electric cell 48 and the amplifier 50, and wires 56 and 57 connect the amplifier 50 and the loud speaker 52.

To operate the apparatus the motion picture projecting machine 10, is operated in the usual manner and the film 11 passing through the projecting machine, projects the pictures of said film on a screen, not shown, in the usual way. At the same time the film 11 passes through the light chamber 20 with its light sound record only, in line with the large aperture 24 in the articulate film guide plate 23. The film 11 then passes from the light chamber 20 and is finally wound up in the take up magazine 45. The optical centers of the lenses 22 and 35 are adjusted so that when the light passes through the light sound record of the film 11, the beams of light from the electric light 46, pass between the spaces or at the ends of the markings of the light sound record of the film and then pass through the aperture 24. The aperture 24 of the plate 23 is large enough to allow the passage of light rays through a number of the markings on the film. The beams of light pass through the shutter 30, which is adjusted by means of a handle or screw diagrammatically indicated in the drawing to emit sharp rays of light and the latter finally pass through the slit 40, in the end plate 38, to the photo electric cell 48. The latter is energized according to the markings of the light sound record. As the beams of light pass through the lens 35, they are diverged. The light sound record of the film 11, may be small in size such as if the 16 millimeter film were used; in such case the record thereof is magnified and passes through the slit 40, to excite the photo electric cell 48, in the same way as would be accomplished with a film of standard size. The photo electric cell 48, energizes the amplifier 50, and at the same time the loud speaker 52, is energized and sound is produced. By means of the adjustable shutter 30, the light rays that pass through its opening can be made sharp, to secure the greatest efficiency to excite the photo electric cell 48. Attention is called to the location of the slit 40, in the end plate 38, which is removed from contact with the film 11, thereby avoiding sound abberations resulting from foreign matter accumulating in the said slit. Referring to Fig. 2 instead of the diverging lens 35, the converging lens 60, is located between the film guide plate 23, and the diaphragm plate 28. This modification is employed when a film larger than standard size is used in the motion picture machine, and when the light passes through the light spaces of the light sound record on the film, it is converged so that when the light beam passes through the slit 40, it will function the same as if a standard film were used. Varying modifications may be made in the invention and the present exemplification is to be taken as illustrative and not limitative thereof.

Having described our invention what we desire to secure by Letters Patent and claim is:

1. In an apparatus of the character described, the combination of a light chamber comprising a shell, a lens at one end of the shell, an end plate having a microscopic slit at the other end of the shell, a film guide plate having a large aperture in the shell and spaced from said lens and said end plate, said shell having openings for the passage of film having a light sound record thereon adjacent to said film guide plate and a lens in the shell positioned between the film guide plate and said end plate.

2. In an apparatus of the character described, the combination of a light chamber comprising a shell, a lens at one end of the shell, an end plate having a microscopic slit at the other end of the shell, a film guide plate having a large aperture in said shell and spaced from said lens, said shell having openings for the passage of a film having a light sound record thereon adjacent to said film guide plate, a diaphragm plate having an opening adjacent to but spaced from said end plate, a shutter for the opening in the diaphragm plate and a lens of the diverging type in the shell between said film guide plate and said diaphragm plate.

3. In combination, a motion picture projecting machine, a light chamber adjacent to said machine, means to move a picture film having a photographic sound record thereon, through the motion picture machine and then through said light chamber, an end plate having a microscopic slit at one end of said light chamber, means to send beams of light through said light chamber to pass through the photographic record of said film, means in said chamber to vary the divergence of said beams of light after passing through the photographic sound record of the film, a light sensitive cell opposite the microscopic slit of said end plate, an element adapted to produce sound and connections between said element and said sensitive cell.

Signed at the borough of Manhattan, city of New York, in the county of New York and State of New York, this 25th day of November, A. D. 1930.

LYMAN A. WILSON.
JOSEPH JOHNSON.